(12) United States Patent
Weigand

(10) Patent No.: US 12,346,322 B1
(45) Date of Patent: Jul. 1, 2025

(54) SYSTEMS AND METHODS FOR EFFICIENT DATA INTERCHANGE QUERYING

(71) Applicant: United Services Automobile Association (USAA), San Antonio, TX (US)

(72) Inventor: Joshua Garrett Weigand, Austin, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/340,393

(22) Filed: Jun. 23, 2023

Related U.S. Application Data

(60) Provisional application No. 63/366,971, filed on Jun. 24, 2022.

(51) Int. Cl.
*G06F 16/245* (2019.01)
*G06F 16/22* (2019.01)
*G06F 16/2453* (2019.01)
*G06F 16/25* (2019.01)

(52) U.S. Cl.
CPC .... *G06F 16/24542* (2019.01); *G06F 16/2246* (2019.01); *G06F 16/258* (2019.01)

(58) Field of Classification Search
CPC ........... G06F 16/24542; G06F 16/2246; G06F 16/258
See application file for complete search history.

(56) References Cited

U.S. PATENT DOCUMENTS

| | | | | |
|---|---|---|---|---|
| 2010/0070448 | A1* | 3/2010 | Omoigui | H01L 27/1463 706/55 |
| 2014/0122445 | A1* | 5/2014 | Hashimoto | G06F 16/217 707/690 |

* cited by examiner

*Primary Examiner* — Truong V Vo
(74) *Attorney, Agent, or Firm* — Fletcher Yoder, PC

(57) ABSTRACT

Techniques are provided herein for filtering, modifying and/or transforming result data sets supplied by an application programming interface (API) independent of a schema defining a data contract between the API and the query service.

20 Claims, 18 Drawing Sheets

```
                                                                  ┌─ 700
┌─────────────────────────────────┬─────────────────────────────────┐
│ {                          702  │ {                          704  │
│   firstName                     │   "firstName": "John",          │
│   lastName                      │   "lastName": "Wick",           │
│   <car{                         │   "make": "Ford",               │
│     make                        │   "model": "Mustang"            │
│     model                       │ }                               │
│   }                             │                                 │
│ }                               │                                 │
└─────────────────────────────────┴─────────────────────────────────┘
```

*FIG. 7*

```
                                                                  ┌─ 800
┌─────────────────────────────────┬─────────────────────────────────┐
│                            802  │ {                          804  │
│ {                               │   "collection": [               │
│   collection(type = 'rifle') {  │     {"name": "FN SCAR-H"},      │
│     name                        │     {"name": "Ruger M77"},      │
│   }                             │   ]                             │
│ }                               │ }                               │
└─────────────────────────────────┴─────────────────────────────────┘
```

*FIG. 8*

```
                                                                  ┌─ 900
┌─────────────────────────────────┬─────────────────────────────────┐
│ {                          902  │ {                          904  │
│   id: VALUE.of('1001')          │   "id": "1001",                 │
│   firstName                     │   "firstName": "John",          │
│   lastName                      │   "lastName": "Wick"            │
│ }                               │ }                               │
└─────────────────────────────────┴─────────────────────────────────┘
```

*FIG. 9*

```
                                                        ┌─ 1000
┌─────────────────────────┬─────────────────────────┐
│ {              1002     │ {              1004     │
│   age.toString()        │   "age": "55,           │
│   <car{                 │   "year": 1969          │
│     year.cast(int)      │ }                       │
│   }                     │                         │
│ }                       │                         │
└─────────────────────────┴─────────────────────────┘
```

*FIG. 10*

```
                                                        ┌─ 1100
┌─────────────────────────┬─────────────────────────┐
│ {              1102     │ {              1104     │
│   firstInitial: firstName.charAt(0) │ "firstInitial": "J", │
│   lastInitial: lastName.charAt(0)   │ "lastInitial": "W"   │
│ }                       │ }                       │
└─────────────────────────┴─────────────────────────┘
```

*FIG. 11*

```
                                                        ┌─ 1200
┌─────────────────────────────────────┬─────────────────────────┐
│ {                          1202     │ {              1204     │
│   isEqual: firstName.compareTo('John') │   "isEqual": 0,       │
│   isEqual2: firstName.compareToIgnoreCase │ "isEqual2": 0,    │
│ ('john')                            │   "isEqual3": -1        │
│   isEqual3: firstName.compareToIgnoreCase │ }                 │
│ ('WICK')                            │                         │
│ }                                   │                         │
└─────────────────────────────────────┴─────────────────────────┘
```

*FIG. 12*

```
                                                              ┌─ 1900
                                                    1902              1904
┌─────────────────────────────────────────┬─────────────────────────┐
│ {                                       │ {                       │
│ plain: firstName.matches('Josh')        │ "plain": false,         │
│ regex: firstName.matches('J.*$')        │ "regex": true           │
│ }                                       │ }                       │
└─────────────────────────────────────────┴─────────────────────────┘
```

*FIG. 19*

```
                                                                        ┌─ 2000
                                                                           2002
┌──────────────────────────────────────────────────────────────────────────┐
│ {                                                                        │
│     firstName.replace('John','Josh')                                     │
│     phrase-1: VALUE.of("engineers engineering while engine-ing")         │
│         .replaceFirst('engineer','pioneer')                              │
│     phrase-1: VALUE.of("engineers engineering while engine-ing")         │
│         .replaceAll('engine','pioneer')                                  │
│         .replace('pioneerers','pioneers')                                │
│         .replace("pioneerering",'pioneering')                            │
│ }                                                                        │
├──────────────────────────────────────────────────────────────────────────┤
│ {                                                                   2004 │
│ "firstName": "Josh",                                                     │
│ "phrase-1": "pioneers engineering while engine-ing",                     │
│ "phrase-2": "pioneers pioneering while pioneer-ing"                      │
│ }                                                                        │
└──────────────────────────────────────────────────────────────────────────┘
```

*FIG. 20*

```
                                                              ┌─ 2100
                                                    2102              2104
┌─────────────────────────────────────────┬─────────────────────────┐
│ {                                       │ {                       │
│ collection(type = 'pistol') {           │     "collection": [     │
│     name.split(' ')                     │         "Beretta", "92FS",│
│ }                                       │ "Inox"                  │
│ }                                       │     ]                   │
│                                         │ }                       │
└─────────────────────────────────────────┴─────────────────────────┘
```

*FIG. 21*

```
                                                    ┌─ 2700
                                             2704
    2702              [
                      {
                          "type": "pistol",
                          "name": "Beretta 92FS Inox",
                          "caliber": 9
                      },
                      {
                          "type": "submachine",
                          "name": "Heckler & Koch MP5K",
                          "caliber": 9
                      },
                      {
                          "type": "shotgun",
                          "name": "Kel-Tec KSG",
                          "gauge": 12
                      },
    {                 {
      <collection         "type": "rifle",
    }                     "name": "FN SCAR-H",
                          "caliber": 7.62
                      },
                      {
                          "type": "rifle",
                          "name": "Ruger M77",
                          "caliber": 6.8
                      },
                      {
                          "type": "other",
                          "name": "pencil",
                          "color": "yellow"
                      }
                      ]
```

*FIG. 27*

```
                                                    2802
{
    pistols: collection(type = 'pistol') {
        <name
    }
    shotguns: collection(name = 'Kel-Tec KSG'){
        <name
    }
    rifles: collection(type = 'rifle') {
        <name
    }
    other: collection(color = 'yellow') {
        <name
    }
}
```

```
                                      2804
{
    "pistols": [
        "Beretta 92FS Inox"
    ],
    "shotguns": [
        "Kel-Tec KSG"
    ],
    "rifles": [
        "FN SCAR-H",
        "Ruger M77"
    ],
    "other": [
        "pencil"
    ]
}
```

```
{
    guns: collection(name != 'pencil'){
        name
        type
    }
}
```

```
{                                         2904
    "guns": [
        {
            "name": "Beretta 92FS Inox",
            "type": "pistol"
        },
        {
            "name": "Heckler & Koch MP5K",
            "type": "submachine"
        },
        {
            "name": "Kel-Tec KSG",
            "type": "shotgun"
        },
        {
            "name": "FN SCAR-H",
            "type": "rifle"
        },
        {
            "name": "Ruger M77",
            "type": "rifle"
        }
    ]
}
```

*FIG. 29*

```
{
    empty: collection(gauge < 10)
    one: collection(gauge > 10)
    two: collection(caliber <= 6.8)
    three: collection(caliber >= 7.6)
}
```

```
{
    "empty": [],
    "one": [
        {
            "type": "shotgun",
            "name": "Kel-Tec KSG",
            "gauge": 12
        }
    ],
    "two": [
        {
            "type": "rifle",
            "name": "Ruger M77",
            "caliber": 6.8
        },
        {
            "type": "other",
            "name": "pencil",
            "caliber": 6
        }
    ],
    "three": [
        {
            "type": "pistol",
            "name": "Beretta 92FS Inox",
            "caliber": 9
        },
        {
            "type": "submachine",
            "name": "Heckler & Koch MP5K",
            "caliber": 9
        },
        {
            "type": "rifle",
            "name": "FN SCAR-H",
            "caliber": 7.62
        }
    ]
}
```

3202
{
date: DATE
parse: DATE.parse('2022-01-01','yyyy-MM-dd')
format: DATE.format('yyyyMMdd')
day: DATE.format('E')
getMonth: DATE.getMonth()
getMonthValue: DATE.getMonthValue()
getYear: DATE.getYear()
getEra: DATE.getEra()
getChronology: DATE.getChronology()
getDayOfWeek: DATE.getDayOfWeek()
getDayOfMonth: DATE.getDayOfMonth()
getDayOfYear: DATE.getDayOfYear()
atStartOfDay: DATE.atStartOfDay()
lengthOfMonth: DATE.lengthOfMonth()
lengthOfYear: DATE.lengthOfYear()
toEpochDay: DATE.toEpochDay()
isLeapYear: DATE.isLeapYear()
plusDays: DATE.plusDays(1)
plusMonths: DATE.plusMonths(1)
plusWeeks: DATE.plusWeeks(1)
plusYears: DATE.plusYears(1)
minusDays: DATE.minusDays(1)
minusMonths: DATE.minusMonths(1)
minusWeeks: DATE.minusWeeks(1)
minusYears: DATE.minusYears(1)
}

3204
{
"date": "2022-05-26",
"parse": "2022-01-01",
"format": "20220526",
"day": "Thu",
"getMonth": "MAY",
"getMonthValue": 5,
"getYear": 2022,
"getEra": "CE",
"getChronology": "ISO",
"getDayOfWeek": "THURSDAY",
"getDayOfMonth": 26,
"getDayOfYear": 146,
"atStartOfDay": "2022-05-26T00:00",
"lengthOfMonth": 31,
"lengthOfYear": 365,
"toEpochDay": 19138,
"isLeapYear": false,
"plusDays": "2022-05-27",
"plusMonths": "2022-06-26",
"plusWeeks": "2022-06-02",
"plusYears": "2023-05-26",
"minusDays": "2022-05-25",
"minusMonths": "2022-04-26",
"minusWeeks": "2022-05-19",
"minusYears": "2021-05-26"
}

3302
```
{
time: TIME
getHour: TIME.getHour()
getMinute: TIME.getMinute()
getSecond: TIME.getSecond()
getNano: TIME.getNano()
plusHours: TIME.plusHours(1)
plusMinutes: TIME.plusMinutes(1)
plusSeconds: TIME.plusSeconds(1)
plusNanos: TIME.plusNanos(1)
minusHours: TIME.minusHours(1)
minusMinutes: TIME.minusMinutes(1)
minusSeconds: TIME.minusSeconds(1)
minusNanos: TIME.minusNanos(1)
toSecondOfDay: TIME.toSecondOfDay()
toNanoOfDay: TIME.toNanoOfDay()
isBefore: TIME.isBefore('01: 00')
isAfter: TIME.isAfter('01: 00')
isBetween: TIME.isBetween('01:00','24:00')
isNotBetween: TIME.isNotBetween(
    '08:00','17:00'
)
}
```

3304
```
{
"time": "16:02:53.762",
"getHour": 16,
"getMinute": 2,
"getSecond": 53,
"getNano": 763000000,
"plusHours": "17:02:53.763",
"plusMinutes": "16:03:53.763",
"plusSeconds": "16:02:54.763",
"plusNanos": "16:02:53.763000001",
"minusHours": "15:02:53.763",
"minusMinutes": "16:01:53.763",
"minusSeconds": "16:02:52.763",
"minusNanos": "16:02:53.762999999",
"toSecondOfDay": 57773,
"toNanoOfDay": 57773763000000,
"isBefore": false,
"isAfter": true,
"isBetween": true,
"isNotBetween": false
}
```

```
{                                                        3402
    dateTime: DATETIME
    parse1: DATETIME.parse('2022-01-01T11: 50: 55')
    parse2: DATETIME.parse(
        '2022-01-01 10:15:30 Europe/Paris',
        'yyyy-MM-dd HH: mm: ss z'
    )
    format: DATETIME.format('yyyyMMdd')
    day: DATETIME.format('E')
    getHour: DATETIME.getHour()
    getMinute: DATETIME.getMinute()
    getSecond: DATETIME.getSecond()
    getNano: DATETIME.getNano()
    getMonthValue: DATETIME.getMonthValue()
    getYear: DATETIME.getYear()
    getChronology: DATETIME.getChronology()
    getDayOfWeek: DATETIME.getDayOfWeek()
    getDayOfMonth: DATETIME.getDayOfMonth()
    getDayOfYear: DATETIME.getDayOfYear()
    plusDays: DATETIME.plusDays(1)
    plusMonths: DATETIME.plusMonths(1)
    plusWeeks: DATETIME.plusWeeks(1)
    plusYears: DATETIME.plusYears(1)
    plusHours: DATETIME.plusHours(1)
    plusMinutes: DATETIME.plusMinutes(1)
    plusSeconds: DATETIME.plusSeconds(1)
    plusNanos: DATETIME.plusNanos(1)
    minusDays: DATETIME.minusDays(1)
    minusMonths: DATETIME.minusMonths(1)
    minusWeeks: DATETIME.minusWeeks(1)
    minusYears: DATETIME.minusYears(1)
    minusHours: DATETIME.minusHours(1)
    minusMinutes: DATETIME.minusMinutes(1)
    minusSeconds: DATETIME.minusSeconds(1)
    minusNanos: DATETIME.minusNanos(1)
    toLocalDate: DATETIME.toLocalDate()
    toLocalTime: DATETIME.toLocalTime()
    isBefore: DATETIME.isBefore(
        '2022-01-01T11: 50: 55'
    )
    isAfter: DATETIME.isAfter(
        '2022-01-01T11: 50: 55'
    )
}
```

```
                                                         3404
{
    "dateTime": "2022-05-26T16:02:53.788",
    "parse1": "2022-01-01T11:50:55",
    "parse2": "2022-01-01T10:15:30",
    "format": "20220526",
    "day": "Thu",
    "getHour": 16,
    "getMinute": 2,
    "getSecond": 53,
    "getNano": 810000000,
    "getMonthValue": 5,
    "getYear": 2022,
    "getChronology": "ISO",
    "getDayOfWeek": "THURSDAY",
    "getDayOfMonth": 26,
    "getDayOfYear": 146,
    "plusDays": "2022-05-27T16:02:53.811",
    "plusMonths": "2022-06-26T16:02:53.811",
    "plusWeeks": "2022-06-02T16:02:53.811",
    "plusYears": "2023-05-26T16:02:53.811",
    "plusHours": "2022-05-26T17:02:53.811",
    "plusMinutes": "2022-05-26T16:03:53.811",
    "plusSeconds": "2022-05-26T16:02:54.811",
    "plusNanos": "2022-05-26T16:02:53.812000001",
    "minusDays": "2022-05-25T16:02:53.812",
    "minusMonths": "2022-04-26T16:02:53.812",
    "minusWeeks": "2022-05-19T16:02:53.812",
    "minusYears": "2021-05-26T16:02:53.812",
    "minusHours": "2022-05-26T15:02:53.812",
    "minusMinutes": "2022-05-26T16:01:53.812",
    "minusSeconds": "2022-05-26T16:02:52.812",
    "minusNanos": "2022-05-26T16:02:53.811999999",
    "toLocalDate": "2022-05-26",
    "toLocalTime": "16:02:53.812",
    "isBefore": false,
    "isAfter": true
}
```

*FIG. 34*

SYSTEMS AND METHODS FOR EFFICIENT DATA INTERCHANGE QUERYING

CROSS-REFERENCE TO RELATED APPLICATION

The present application claims priority to and the benefit of U.S. Provisional Application No. 63/366,971, entitled "SYSTEMS AND METHODS FOR EFFICIENT DATA INTERCHANGE QUERYING" and filed on Jun. 24, 2022, the disclosure of which is incorporated by reference herein in its entirety for all purposes.

BACKGROUND

The present disclosure relates generally to systems and methods related to efficient data interchange querying. More specifically, the present disclosure relates to techniques enabling on the fly data manipulation and customizable result sets via a data interchange format (e.g., JavaScript Object Notation (JSON)) query service.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

In an ever-increasing digital world, increased reliance on efficient data interchange has become key. Data interchange formatting standards, such as the JavaScript Object Notation (JSON) format, have become widely adopted open standards for data interchange for REST APIs. One of JSON's greatest strengths is that it offers a syntax that's both human-readable and lightweight, making it an ideal choice for most of today's applications. Developers have an extensive collection of libraries that can read and write JSON. However, when it comes to manipulating and transforming JSON, custom code is usually written to solve this problem which can be time consuming and repetitive.

While certain query services, such as GraphQL, exist to provide limited solutions for obtaining customized JSON result sets, these services typically require significant setup prior to use, resulting in a rigid adherence to that setup. For example, in order to integrate GraphQL with a developer application programming interface (API), a developer must adhere to GraphQL's type system, which enforces a data contract between the client and the server. This creates a rigid API requirement, requiring the API to return a dataset that adheres to a static format. Indeed, APIs that do not adhere to the particular data contract specified in the setup via GraphQL's type system are not compatible with GraphQL, limiting manipulation and/or transformation of datasets from such APIs via the query services. Further, even when APIs do adhere to the particular data contract, existing query services typically have a limited ability to manipulate and transform result sets. As such, improved systems and methods for efficient manipulation and transformation of data interchange formats, such as JSON, are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein provide efficient manipulation and/or transformation of data via a query service that receives a query statement adhering to a query language of the query service. Rather than using a type-system to generate a data contract for an API to adhere to, the query service described herein provides a more efficient solution that does not rely upon specific data contracts being defined and generated. Instead, the current techniques dynamically serialize API result sets (e.g., JSON strings) into dynamic and/or generic object (e.g., Plain Old Java Objects (POJOs)) and/or node tree representation, enabling traversal of a node tree for satisfying a received query statement. In this manner, the query statements/query language may be significantly more flexible than current solutions, enabling dynamic execution and return of customized query results for virtually any API that returns results in an expected format, without dependence on a particular schema/data contract adherence by the API. Further, the query service described herein adds new features to further enhance result set modifications/transformations. For example, the query service may provide un-nesting/flat-mapping support, advanced relational filtering, value injection, string modifiers, collection modifiers, node modifiers, data/time modifiers, sub-query support, etc.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 is a schematic diagram, illustrating a sample un-nesting/flat-mapping query and resulting query results, in accordance with certain embodiments;

FIG. 8 is a schematic diagram, illustrating a sample relational filtering query and resulting query results, in accordance with certain embodiments;

FIG. 9 is a schematic diagram, illustrating a sample value injection query and resulting query results, in accordance with certain embodiments;

FIGS. 10-24 provide string modifier queries and corresponding query results sets, in accordance with certain embodiments;

FIG. 10 is a schematic diagram, illustrating a sample cast query and resulting query results, in accordance with certain embodiments;

FIG. 11 is a schematic diagram, illustrating a sample character at query and resulting query results, in accordance with certain embodiments;

FIG. 12 is a schematic diagram, illustrating a sample compare to and compare to ignore query and resulting query results, in accordance with certain embodiments;

FIG. 13 is a schematic diagram, illustrating a sample concatenation query and resulting query results, in accordance with certain embodiments;

FIG. 14 is a schematic diagram, illustrating a sample starts with and ends with query and resulting query results, in accordance with certain embodiments;

FIG. 15 is a schematic diagram, illustrating a sample equals and equals ignore case query and resulting query results, in accordance with certain embodiments;

FIG. 16 is a schematic diagram, illustrating a sample if then else query and resulting query results, in accordance with certain embodiments;

FIG. 17 is a schematic diagram, illustrating a sample is empty query and resulting query results, in accordance with certain embodiments;

FIG. 18 is a schematic diagram, illustrating a sample length query and resulting query results, in accordance with certain embodiments;

FIG. 19 is a schematic diagram, illustrating a sample matches query and resulting query results, in accordance with certain embodiments;

FIG. 20 is a schematic diagram, illustrating a sample replace, replace all, and replace first query and resulting query results, in accordance with certain embodiments;

FIG. 21 is a schematic diagram, illustrating a sample split query and resulting query results, in accordance with certain embodiments;

FIG. 22 is a schematic diagram, illustrating a sample to character array query and resulting query results, in accordance with certain embodiments;

FIG. 23 is a schematic diagram, illustrating a sample to lower case, to upper case, and to string query and resulting query results, in accordance with certain embodiments;

FIG. 24 is a schematic diagram, illustrating a sample trim query and resulting query results, in accordance with certain embodiments;

FIGS. 25-29 provide collection modifier queries and corresponding query results sets, in accordance with certain embodiments;

FIGS. 25 and 26 are schematic diagrams, illustrating sample get queries and resulting query results, in accordance with certain embodiments;

FIG. 27 is a schematic diagram, illustrating a flatten collection query and resulting query results, in accordance with certain embodiments;

FIG. 28 is a schematic diagram, illustrating equal to filter query and resulting query results, in accordance with certain embodiments;

FIG. 29 is a schematic diagram, illustrating a not equal to query and resulting query results, in accordance with certain embodiments;

FIG. 30 is a schematic diagram, illustrating a less than, less than or equal to, greater than, greater than or equal to query and resulting query results, in accordance with certain embodiments;

FIG. 32 is a schematic diagram, illustrating a sample time modifiers query and resulting query results, in accordance with certain embodiments;

FIG. 33 is a schematic diagram, illustrating a sample time modifiers query and resulting query results, in accordance with certain embodiments;

FIG. 34 is a schematic diagram, illustrating a sample data/time modifiers query and resulting query results, in accordance with certain embodiments.

DETAILED DESCRIPTION

Figure 1:
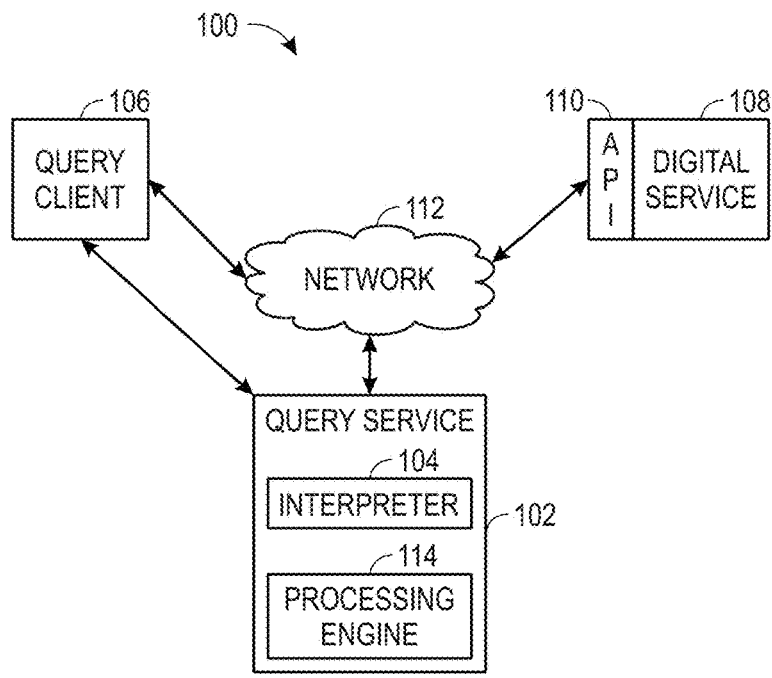
FIG. 1 is a schematic diagram, illustrating a system including a contractless query service, in accordance with certain embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned herein, data interchanges, for example result data sets provided from an application programming interface (API) in response to a data request, are oftentimes provided via a standard data interchange format (e.g., the JavaScript Object Notation (JSON)). Unfortunately, these data interchanges typically provide a very rigid results data set, which can provide significantly more data than desired. This can lead to transmission inefficiencies, such as increase bandwidth requirements, increased transmission delays, etc. Further, many times, developers have to generate custom code to specially deal with result data sets that provide information in an undesirable format, causing increased resource constraints. To counteract these inefficiencies query languages may provide requests for specific data to return in a results data set. Systems and techniques for efficient querying are provided herein. Specifically, as described herein, a query service may include a query language that enables a large number of filtering, modification, and/or transformation functions to be applied to result data sets. This query service may operate independent of any particular schema defining a data contract that a data source should adhere to in providing their result sets. Instead, the query service may use characteristics of the results data set itself to implement queries provided to the query service. For example, the query service may transform a result data set (e.g., a JSON document) into traversable objects/node tree that the query language can filter, modify and/or transform. In this manner, upon receiving a query statement, the query services may execute the statement on the traversable objects/node tree to provide a filtered, modified, and/or transformed query result.

With this in mind, FIG. 1 is a schematic diagram, illustrating a system 100 including a contractless result set query service 102, in accordance with certain embodiments. As mentioned above, the query service 102 may receive and interpret, via an interpreter 104, query statement(s) provided by a query client 106. Further, the query service 102 may receive a data set (e.g., a result data set) from a digital service 108 (e.g., via an application programming interface 110 over a network 112 (e.g., the Internet). The query service 102 may, via a processing engine 114, execute instructions indicated by the interpreted query statement(s) on the received data set, resulting in a filtered, modified, and/or transformed data set. The filtered, modified, and/or transformed data set may be provided to the query client 106 via the query service 102.

As described herein, the query service 102 may be an independent service accessed by the query client 106 over the network 112 and/or may be implemented at the query client 106 and/or digital service 108. For example, the query service 102 may be built and packaged locally to an existing API. Below is example code for adding dependencies and invoking a query service 102 (herein referred to as "JsonQL").

To add the dependencies, a JAR file including JsonQL snippets as well as dependencies useful for implementing the JsonQL snippets may be added. A sample of such code follows:

```
// Add JsonQL JAR file
implementation files('libs/jsonql-1.0.0-SNAPSHOT.jar')
// Transitive Dependencies (Jackson)
Implementation 'com.fasterxml.jackson.core:jackson-databind'
```

As illustrated, the code implements certain transitive dependencies which may help serialize received data into objects/node trees traversable by the query service 102. For example, in the exemplary code provided, a Java JSON library called Jackson is implemented. Jackson is a set of tools for Java, that includes a streaming JSON parser/generator library and a matching data-binding library that can convert JSON to Plain old Java Objects (POJOs). Accordingly, the Jackson library (or other parser/code) may enable received JSON to be transformed into traversable objects/node trees that may enable the query service 102 (e.g., JsonQL) to easily filter, modify, and/or transform received data into a customized query response, based upon a received query.

After adding in the query service 102 code and the transitive dependencies, JsonQL may then be invoked. Sample code for instantiating the query service code follows:

```
// Instantiate (Alternatively can be injected in via a Bean)
JsonQL jsonQL = JsonQL( );
public JsonNode queryData(string sQuery) {
    // Get target data and serialize it to Jackson-JsonNode
    JsonNode oData = getData( );
    // Invoke JsonQL
    return jsonQL.query(sQuery, oData);
}
```

The Jackson JsonNode class, com.fasterxml.jackson.databind.JsonNode, is Jackson's tree model (object graph model) for JSON. Jackson can read JSON into a JsonNode instance, as is performed by the code above. In this manner, received data (e.g., from getData( )) may be inserted into the tree model (e.g., oData), which may be passed as a parameter along with a query statement (e.g., string sQuery) in a invocation instruction of the query service 102 (e.g., return jsonQL.query (sQuery, oData).

The query service 102, by utilizing a transformed version of the data set received from the digital service 108 may dynamically traverse the received dataset without requiring a data contract/schema definition of a data set format the digital service 108/API 110 is expected to adhere to. In this manner, the query service 102 may be quickly and easily set up using common code for APIs having different data set formats, without providing an indication of the data set formats of these APIs.

In this manner, the interpreter 104 may interpret the query statement (e.g., sQuery) and perform a query on the node tree (e.g., oData), via the processing engine 114, based upon the interpretation of the query statement. The processing engine 114 may then return the query results to the query client 106.

As may be appreciated, these systems and techniques may provide significant simplification of setup, reducing resource requirements and decreasing implementation costs. This may be especially true as more and more APIs come online.

Figure 2:
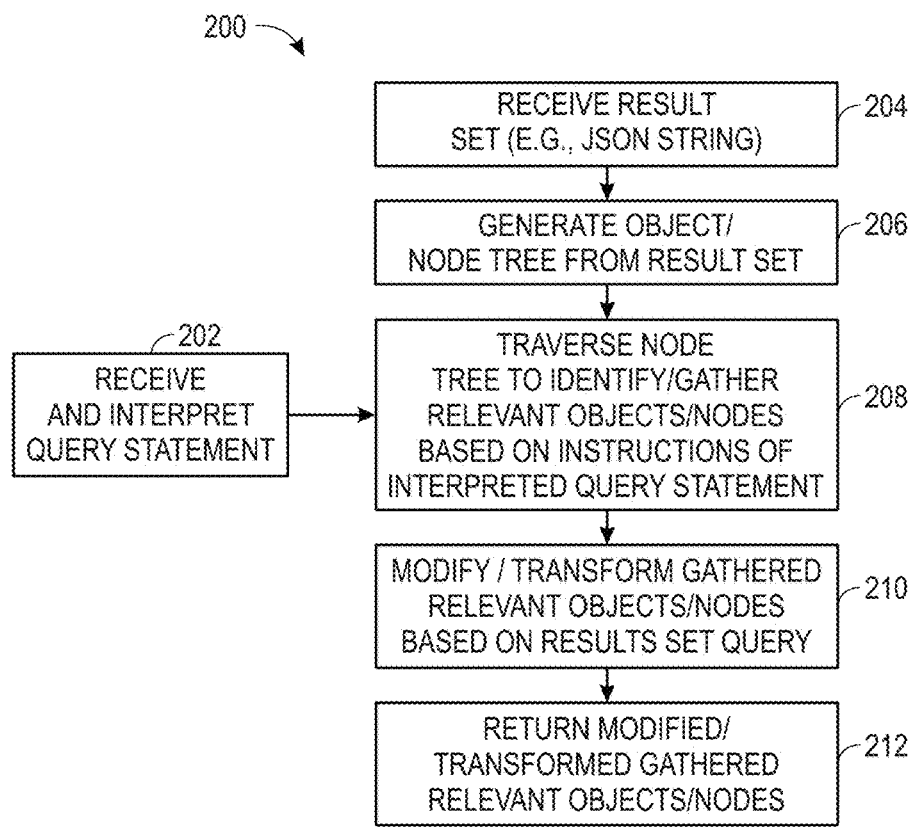
FIG. 2 is a flowchart, illustrating a process for generating query results via the query service of FIG. 1, in accordance with certain embodiments.

FIG. 2 is a flowchart, illustrating a process 200 for generating query results via the query service of FIG. 1, in accordance with certain embodiments. The process 200 includes receiving and interpreting a query statement (block 202). For example, as discussed above, the query service 102 may receive a string (e.g., string sQuery) that provides a query statement written in a query language expected by the query service 102. To interpret the query statement, the query service 102 (e.g., via the interpreter 104) may first clean up the query statement (e.g., by removing empty spaces, tabs, and/or other unexpected characters). Then, the query statement is parsed to identify particular instructions to apply against a received result set.

The process 200 includes receiving a result set as well (block 204). For example, an API may return a JSON string with result data from the API. An object/node tree may be generated from the received result set (block 206). For example, as described above, the JsonNode class of the Jackson library (or other parser) may be used to insert string data of the result set into a traversable node tree, enabling traversal by the query service 102.

Next, the query service 102 may traverse the node tree to identify and/or gather relevant objects/nodes based upon the instructions identified from the interpreted query statement (block 208). For example, as will be discussed in detail below, a number of different filtering, modification, and/or transformation instructions can be applied to the Result Set. By first inserting the result set into the node tree, significant processing efficiencies may be experience, including but not limited to faster processing of query instructions and reduced setup in implementing the query service 102.

Next, the identified instructions from the query statement are applied to the node tree to modify and/or transform gathered relevant objects/nodes (block 210). As may be appreciated, while blocks 208 and 210 are illustrated as separate steps, in some embodiments, the identifying and gathering of relevant objects/nodes in the node tree may be implemented in a combined step with the implementation of the identified instructions, causing filtering, modification, and/or transformation instructions to be implemented in a common step. Upon completion of the filtering, modification, and/or transformation, the resultant filtered, modified, and/or transformed objects/nodes are returned to the requesting query client 106 (block 212).

Figure 3:
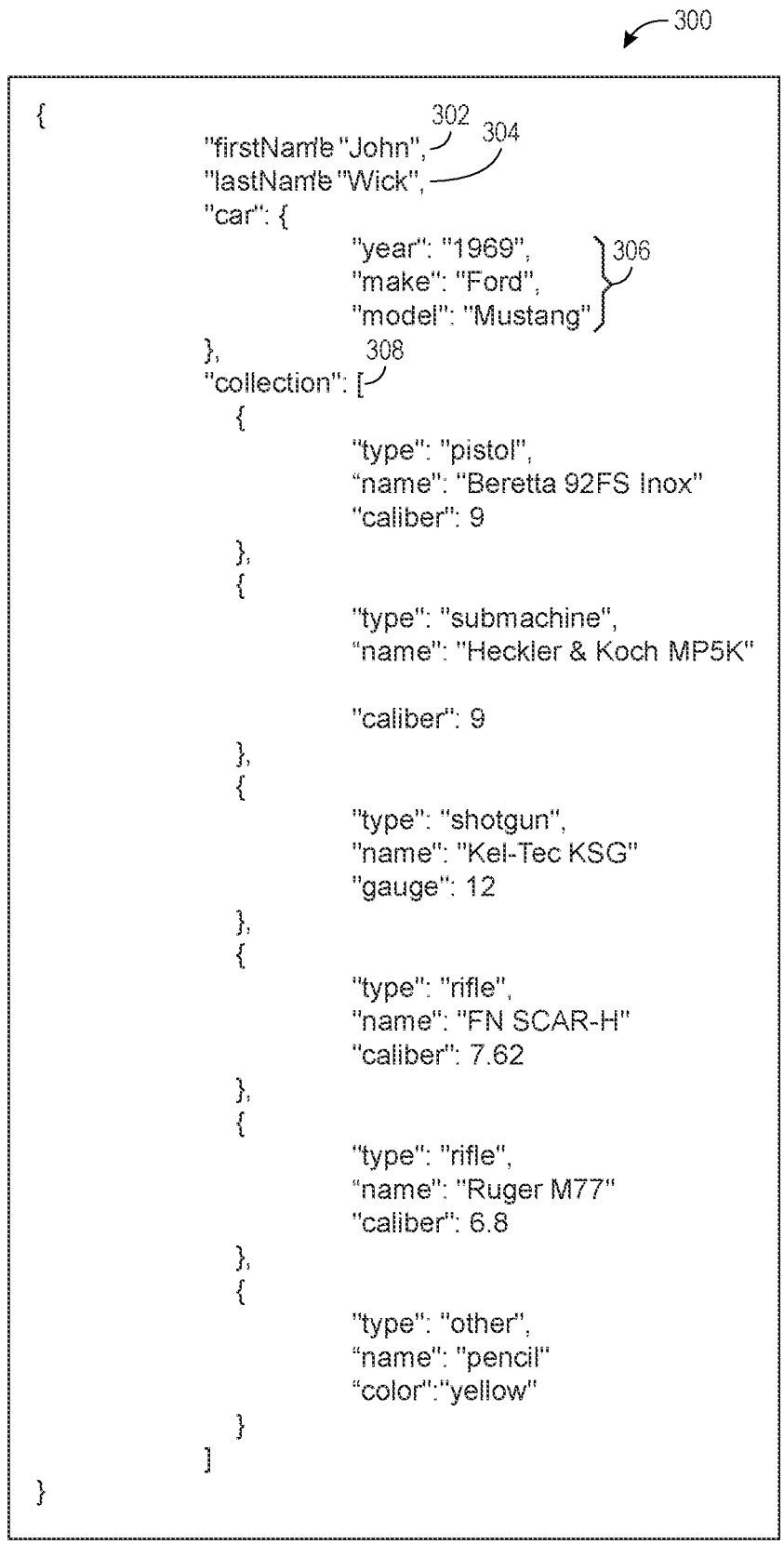
FIG. 3 is a schematic diagram, illustrating a sample JSON document result set from an application programming interface (API), in accordance with certain embodiments.

Having discussed the implementation and operation details of the query service 102, the discussion now turns to example query statements and query results. FIGS. 4-32 provide example query statements and corresponding query results. FIG. 3 is a schematic diagram, illustrating a sample result set 300 (e.g., JSON document) provided from an application programming interface (API) (e.g., API 110), in accordance with certain embodiments. To facilitate discussion of the query language and particular query functions of the query service 102, this result set 300 will be used as the input result set data that the example query statements are applied to, resulting in the exemplary query results. As may be appreciated, the sample result set 300 may include many value types, supported by the formatting standard. For example, JSON may provide strings, numbers, objects, arrays, Booleans, etc. As illustrated, the sample result set 300 includes a string 302 named "firstName" with the value "John" and string named 304 "lastName" with the value "Wick". Further, an object 306 name "car" includes a year string with value "1969", a make string with a value of "Ford" and a model string with a value of "Mustang". Further, a collection 308 named "collection" provides a list of objects including a string named "type" and, in some instances, a string named "name".

Figure 4:
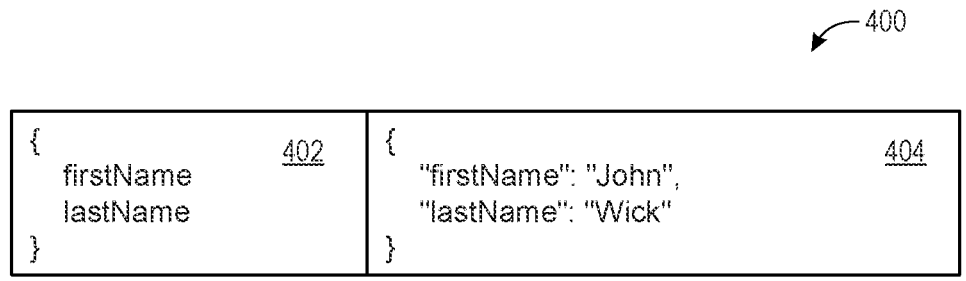
FIG. 4 is a schematic diagram, illustrating a sample filtering query and resulting query results, in accordance with certain embodiments.

FIG. 4 is a schematic diagram 400, illustrating a sample filtering query 402 and resulting query results 404, in accordance with certain embodiments. The query 402 includes instructions to return "firstName" and "lastName". As illustrated in results 404, the requested string names are returned with their associated values "John" and "Wick" without unrequested data, resulting in a filtered result that provides only the desired result data.

Figure 5:
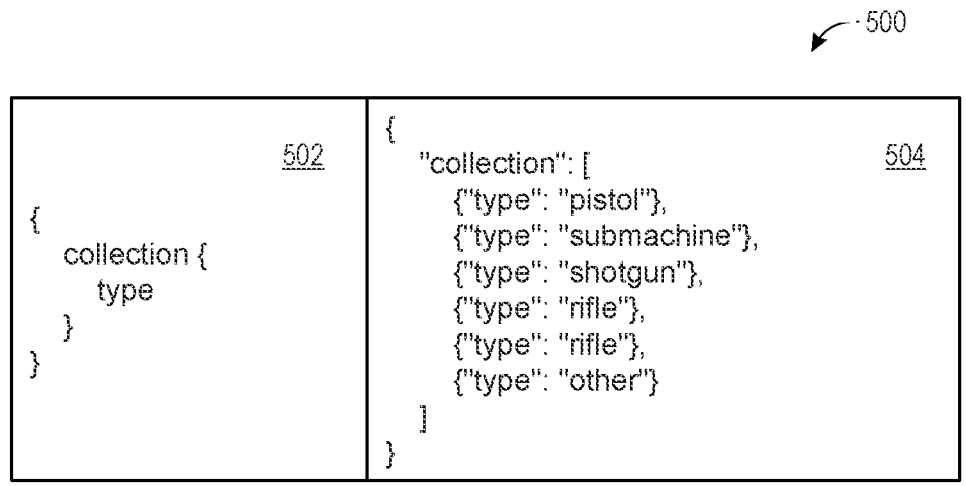
FIG. 5 is a schematic diagram, illustrating a sample collection filtering query and resulting query results, in accordance with certain embodiments.

FIG. 5 is a schematic diagram 500, illustrating a sample collection filtering query 502 and resulting query results 504, in accordance with certain embodiments. In the query 502, the collection name "collection" is provided with an indication of "type", indicating instructions to retrieve all types from collection "collection". As illustrated in results 504, each type is returned within "collection", indicating that these are the type values within the collection "collection".

Figure 6:
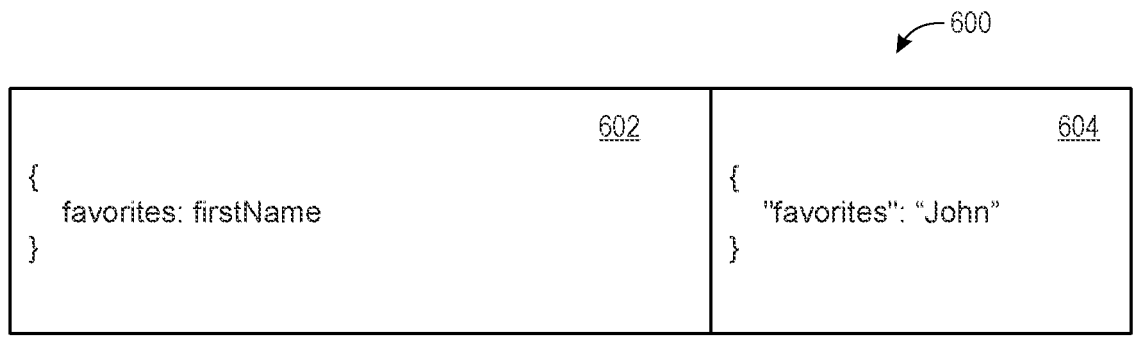
FIG. 6 is a schematic diagram, illustrating a sample alias query and resulting query results, in accordance with certain embodiments.

FIG. 6 is a schematic diagram 600, illustrating a sample alias support query 602 and resulting query results 604, in accordance with certain embodiments. As illustrated in the query 602, a new label "favorites" is provided, followed by a delimiter ":". This indicates that an alias "favorites" should be used as the name for the returned data associated with the following instruction. The following instruction includes a request for a value of firstName. As illustrated in the results 604, a string named "favorites" is returned with "John", which is the value of firstName.

FIG. 7 is a schematic diagram 700, illustrating a sample un-nesting/flat-mapping query 702 and resulting query results 704, in accordance with certain embodiments. The query 702 includes an indication to return firstName and lastName strings. As illustrated in the results 704, this results in "firstName":"John" and "lastName":"Wick" being returned in the results 704.

Further, as illustrated in the query 702, a flattening delimiter indication "<" is placed before an indication to return make and model strings of car objects. The flattening delimiter indication indicates an instruction to flatten out the object car, moving the requested data (e.g., make and model) up one level. For example, as illustrated in the results 704, "make":"Ford" and "model":"Mustang" are "flattened" by stripping them from the "car" object and instead returning them as string values at level equivalent to the returned firstName and lastName.

FIG. 8 is a schematic diagram 800, illustrating a sample relational filtering query 802 and resulting query results 804, in accordance with certain embodiments. The query 802 includes an instruction requesting name values of objects within the collection "collection" that include a type value of "rifle". As illustrated in the results 804, the collection "collection" (is returned with name strings "FN SCAR-H" and "Ruger M77", which are the two names from the sample result set 300 associated with a type="rifle" (e.g., as indicated by { } surrounding the type and name strings in the sample result set 300).

FIG. 9 is a schematic diagram 900, illustrating a sample value injection query 902 and resulting query results 904, in accordance with certain embodiments. The query 902 includes an indication/instruction to return alias "id", which should be assigned the value of a string "1001", which as illustrated by results 904, results in a string named "id" that includes the string value "1001". This illustrates the ability to insert new data into the results 904, as "1001" did not exist in the sample result set 300.

FIGS. 10-24 provide string modifier queries and corresponding query results sets, in accordance with certain embodiments;

FIG. 10 is a schematic diagram 1000, illustrating a sample cast query 1002 and resulting query results 1004, in accordance with certain embodiments. Casting involves changing one data type to another data type. Here, the query 1002 includes an instruction to change a value of "year" of the car object to an integer (e.g., as indicated by cast(int)). Further, there is a flattening delimiter indicator (e.g., "<"), indicating that the integer should be stripped from the car object and instead returned outside the car object. This is precisely what is shown in the results 1004. As illustrated, 1969 is outside of quotes, illustrating that it is an integer. Further, the car object is not surrounding the year value, illustrating that the value has been removed from the car object and returned as an independent data value, also known as "flattened".

The toString function is a casting function that converts a number (e.g., integer) to a string. For example, a third instruction of query 2302 includes returning age with a string conversion of number 55. Accordingly, the results 2304 include id with a string "55".

FIG. 11 is a schematic diagram 1100, illustrating a sample "character at" query 1102 and resulting query results 1104, in accordance with certain embodiments. The charAt(x) instruction returns a character at the "x" position of a referenced string. Here, an alias instruction indicates that the first character (e.g., character 0/x=0) of firstName should be returned with a name of firstInitial. Further, a second instruction indicates that a first character of lastName should be returned with the name lastInitial. Accordingly, as illustrated in the results 1104, firstInitial is returned with a value of "J", as this is the first character of "John", the value of firstName, and lastInitial is returned with a value of "W", as this is the first character of "Wick", the value of lastName.

FIG. 12 is a schematic diagram 1200, illustrating a sample "compare to" and "compare to ignore" query 1202 and resulting query results 1204, in accordance with certain embodiments. The compareto(x) instruction indicates to compare a preceeding value with x to determine if they are the same. If they are the same, a first value (e.g., 0) is returned. Otherwise, if they are different, a second value (e.g., −1) is returned. Certain ignore indications can be provided as well. For example compareToIgnoreCase provides a similar comparison function, while ignoring the case (e.g., upper or lower case) of a character when making a comparison. In this manner, a "J" and "j" would match under such a function. The query 1202 includes a "compareTo" instruction to compare the value of firstName (e.g., "John") to "John" and return a result with an alias name "isEqual". As illustrated in the results 1204, this results in returning "isEqual" with a 0, as these values match.

A second instruction provides a compareToIgnoreCase for comparing the firstName value ("John") with "john" and return the compare result as a value named "isEqual2". Because the IgnoreCase version of the compare function was used, the mismatched "J" and "j" are ignored, and "isEqual2" is returned with a matching indication (e.g., 0).

In a third instruction of query 1202, a comparison request is provided with a request to ignore case (e.g., using compareToIgnoreCase), requesting a comparison between the value of firstName ("John") and "WICK"). Here, while the case will be ignored, the values still do not match, resulting in return of a mismatch value (e.g., −1) as the requested alias "isEqual3".

Figure 13:
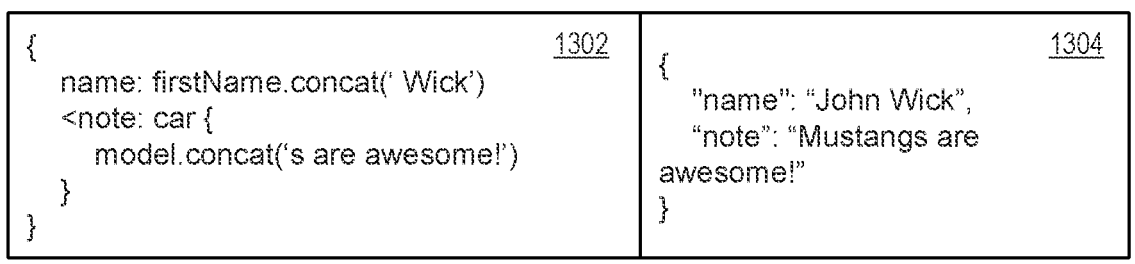

FIG. 13 is a schematic diagram 1300, illustrating a sample concatenation query 1302 and resulting query results 1304, in accordance with certain embodiments. The concat function concatenates first data (e.g., succeeding data) to second data (e.g., preceeding data). For example, in query 1302, a first instruction requests the return of name where the value is the value of firstName ("John") concatenated with "Wick"). Accordingly, as illustrated in the results 1304, name is returned with "John Wick". A second instruction indicates to return note with a flattened value (e.g., as illustrated by the flattening delimiter indication "<") of the car object's value for model (e.g., "Mustang") concatenated with "s are awesome!". Accordingly, note is returned with the value "Mustangs are awesome!".

Figure 14:
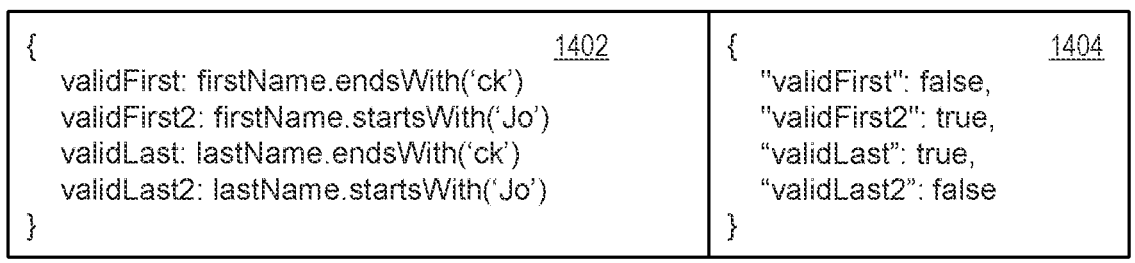

FIG. 14 is a schematic diagram 1400, illustrating a sample "starts with" and "ends with" query 1402 and resulting query results 1404, in accordance with certain embodiments. The startswith function determines whether a first value (e.g., a preceeding value) starts with a second value (e.g., a succeeding value). If so, a true indication is returned. Otherwise, a false indication is returned. The endswith function determines whether a first value (e.g., a preceding value) ends with a second value (e.g., a succeeding value). If so, a true indication is returned. Otherwise, a false indication is returned. The query 1402 includes a first instruction to determine to return a value for alias name "validFirst" that indicates whether the value of firstName (e.g., "John") ends with "ck". Because "John" doesn't end with "ck", a false indication is returned in results 1404 for "validFirst".

A second instruction of query 1402 requests to return a value for alias name "validFirst2" that indicates whether the value of "firstName" (e.g., "John") starts with "Jo". Because "John" starts with "Jo", a true indication is returned as the value for "validFirst2".

A third instruction of query 1402 requests to return a value for alias name "validLast" that indicates whether the value of "lastName" (e.g., "Wick") ends with "ck". Because "Wick" ends with "ck", a true indication is returned as the value for "validLast".

A fourth instruction of query 1402 requests to return a value for alias name "validLast2" that indicates whether the value of "lastName" (e.g., "Wick") starts with "Jo". Because "Wick" doesn't start with "Jo", a false indication is returned as the value for "validLast2".

Figure 15:
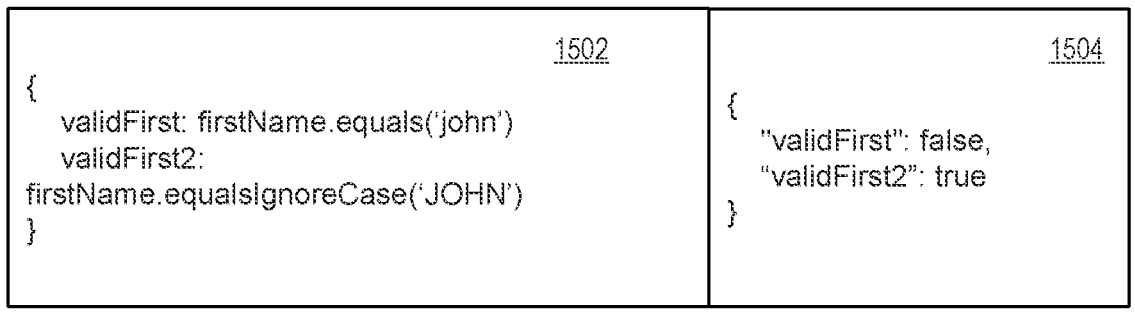

FIG. 15 is a schematic diagram 1500, illustrating a sample "equals" and "equals ignore" case query 1502 and resulting query results 1504, in accordance with certain embodiments. The equals and equalsIgnoreCase functions are similar to the compareTo and compareToIgnoreCase functions except that they return Boolean values instead of 0 and −1 depending on a match. The query 1502 includes an instruction to determine whether the value of firstName (e.g., "John") equals "john" and return a result as "validFirst". As illustrated in the results 1504, a false value is returned for "validFirst" because case is not ignored and the cases of "J" are mismatched between these values.

The query 1502 includes a second instruction to determine whether the value of firstName (e.g., "John") equals "john", ignoring case, and return a result as "validFirst2". As illustrated in the results 1504, a true value is returned for "validFirst2" because case is ignored.

Figure 16:
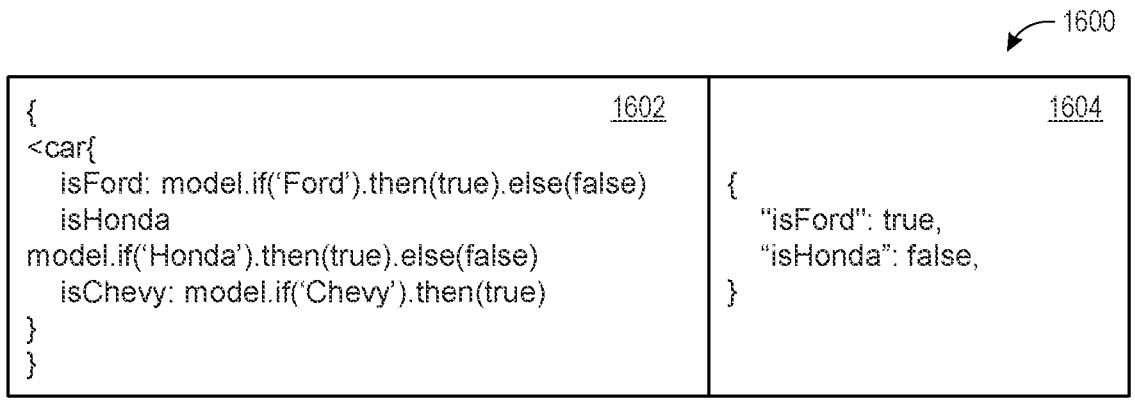

FIG. 16 is a schematic diagram 1600, illustrating a sample if then else query 1602 and resulting query results 1604, in accordance with certain embodiments. The if(x).then(y).else (z) function takes in a condition x, and if true, performs y. If x is not true and "else(z)" is provided, z is performed. The query 1602 includes a flattening delimiter indication indicating that the results obtained from the car object should be returned independent of the car object. A first instruction indicates to return "isFord" with a value of true when the car make equals "Ford" and otherwise return false. Because the car make does equal "Ford", true is returned for isFord, outside of the car object, as illustrated in results 1604.

A second instruction indicates to return "isHonda" with a value of true when the car make equals "Honda" and otherwise return false. Because the car make does not equal "Honda", false is returned for isHonda, outside of the car object, as illustrated in results 1604.

A third instruction indicates to return "isChevy" with a value of true when the car make equals "Chevy". This instruction does not stipulate a return in the "else" case. Accordingly, because the car make does not equal "Chevy", nothing is returned for this instruction, as illustrated in results 1604.

Figure 17:
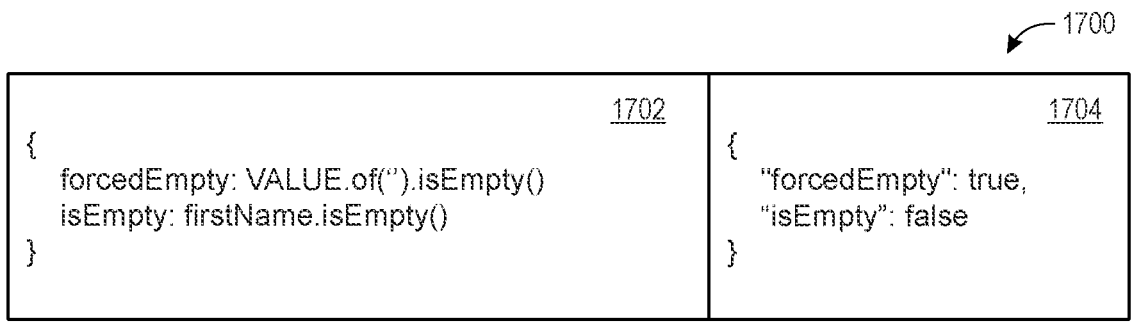

FIG. 17 is a schematic diagram 1700, illustrating a sample "is empty" query 1702 and resulting query results 1704, in accordance with certain embodiments. The isEmpty function determines whether a first value (e.g., a preceeding value) is empty. The query 1702 includes an instruction to provide a value for "forcedEmpty" that is an indication of whether " " is empty. Because " " is empty, "forcedEmpty" is returned with a value of true.

In contrast, a second instruction requests a value for "isEmpty" that is an indication of whether the value of firstName (e.g., "John") is empty. Because "John" is not empty, a false value is returned for "isEmpty".

Figure 18:
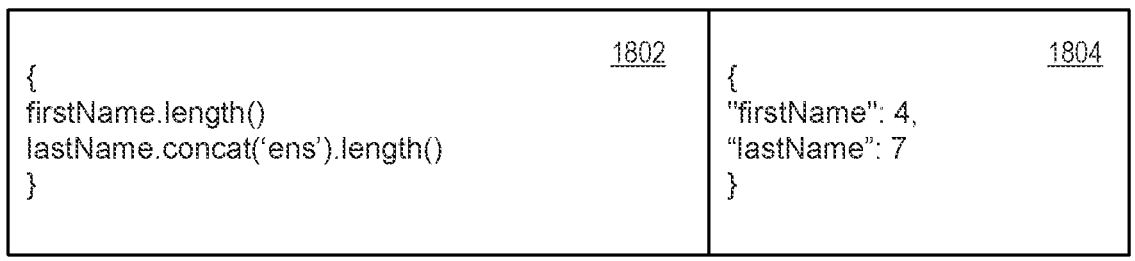

FIG. 18 is a schematic diagram 1800, illustrating a sample length query 1802 and resulting query results 1804, in accordance with certain embodiments. The length function returns a string length. A first instruction of query 1802 requests the length of the value of firstName (e.g., "John"), which is returned without an alias as 4. Additionally a second instruction requests that a length of the value of last name (e.g. "Wick") concatenated with "ens" (e.g., "Wickens") be returned without an alias. As illustrated lastName is returned without an alias with the associated value of 7, the length of "Wickens".

FIG. 19 is a schematic diagram 1900, illustrating a sample matches query 1902 and resulting query results 1904, in accordance with certain embodiments. The matches function may work similar to the equals function and may allow regular expressions to be used in the matching criteria. For example, the first instruction of query 1902 acts as the equals function, returning a false for plain because "Josh" does not match "John". However, the second instruction provides a matching query with regular expressions that require the string to start with "J" (e.g., as indicated by the "J"), and then any character (e.g., as indicated by "."), and then anything but the preceding character (e.g., no repeat, as indicated by "*"), and then any character, as long as it serves as the end of the string (e.g., as indicated by "$"). The value of firstName (e.g., "John") fits each of these criteria. Thus, a match is found and a true value is returned for the alias name "regex".

FIG. 20 is a schematic diagram 2000, illustrating a sample "replace", "replace all", and "replace first" query 2002 and resulting query results 2004, in accordance with certain embodiments. The replace(x,y) function replaces value x with value y in an indicated value. The replaceFirst(x,y) function replaces a first instance of value x with a value y. The replaceAll(x,y) function replaces all instances of value x with value y, regardless of whether value x is a complete match.

A first instruction in query 2002 replaces "John" with "Josh" in the value of firstName (e.g., "John"). Accordingly, as illustrated in results 2004, firstName is returned with value "Josh".

A second instruction adds, via the VALUE.of function, a phrase-1 "engineers engineering", but replaces the first instance of "engineer" with "pioneer", resulting in returning phrase-1 with value "pioneers engineering".

A third instruction adds, via the VALUE.of function, a phrase-1 "engineers engineering", but replaces all instances of "engine" with "pioneer", resulting in "pioneers pioneering" and then also instructing to replace full matches of "pioneerers" with "pioneers", resulting in "pioneers pioneering", and then replacing full matches of "pioneereering" with "pioneering", "returning phrase-1 with value "pioneers pioneering".

FIG. 21 is a schematic diagram 2100, illustrating a sample split query 2102 and resulting query results 2104, in accordance with certain embodiments. The split (x) function splits out portions of a value separated by x into an array. For example, query 2102 includes an instruction to return the name of objects within the collection that are associated with the type pistol (e.g., "Beretta 92FS Inox"), split out based upon presence of " ". Accordingly, the collection is returned with an array including values of "Beretta", "92FS", and "Inox" in the results 2104.

Figure 22:
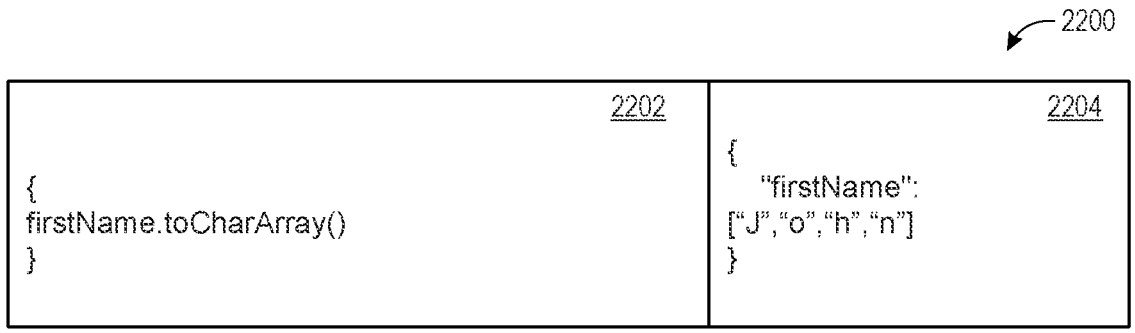

FIG. 22 is a schematic diagram 2200, illustrating a sample "to character array" query 2202 and resulting query results 2204, in accordance with certain embodiments. The toCharArray function splits string characters out into an array of individual characters. The query 2202 includes an instruction to split the string value of firstName (e.g., "John") into an array, which is returned in the results 2204 of FIG. 22.

Figure 23:
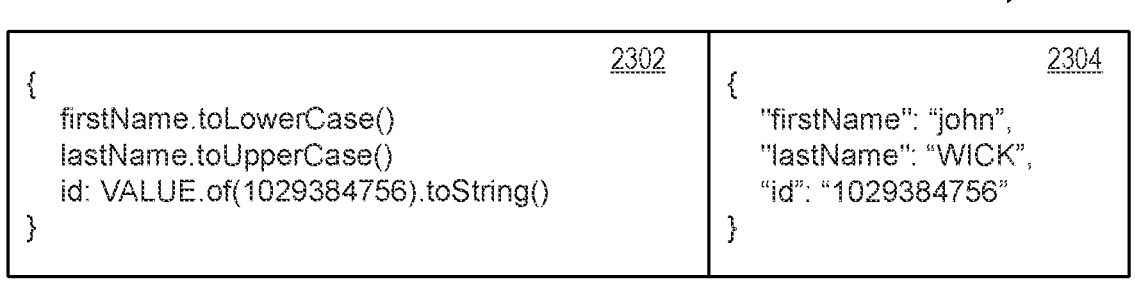

FIG. 23 is a schematic diagram 2300, illustrating a sample "to lower case" and "to upper case query 2302 and resulting query results 2304, in accordance with certain embodiments. The toLowerCase function converts any uppercase characters in a specified value to lowercase. For example, the query 2302 includes a first instruction to change uppercase characters to lowercase in the value of firstName (e.g., "John"), resulting in firstName being returned as "john" in results 2304.

Conversely, the toUpperCase function converts any lowercase characters of an indicated value to uppercase. The query 2302 includes a second instruction to convert any lowercase characters of the value of lastName (e.g., "Wick") to uppercase. Accordingly, lastName is returned with value "WICK" in the results 2304.

Figure 24:
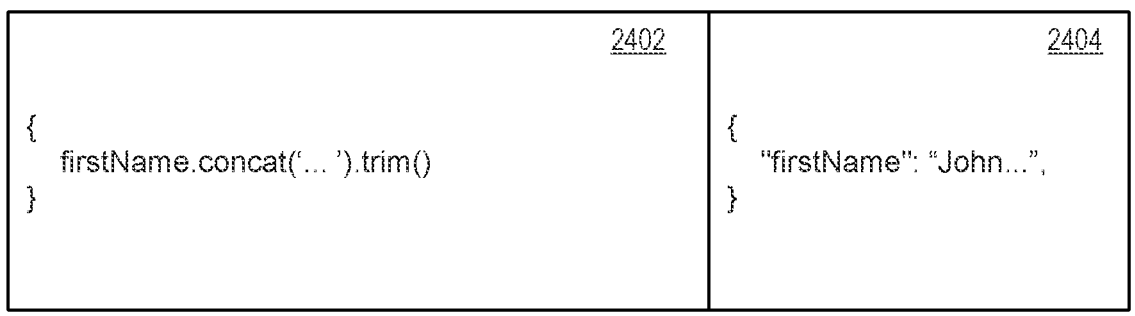

FIG. 24 is a schematic diagram 2400, illustrating a sample trim query 2402 and resulting query results 2404, in accordance with certain embodiments. The trim function removes any following spaces after a value. For example, the query 2402 includes an instruction to concatenate " . . . " to the value of firstName (e.g., "John"), resulting in "John . . . ". The instruction also includes an indication to trim the value, resulting in the trailing spaces to be removed, and "John . . . " being returned as the value of firstName.

Figure 25:
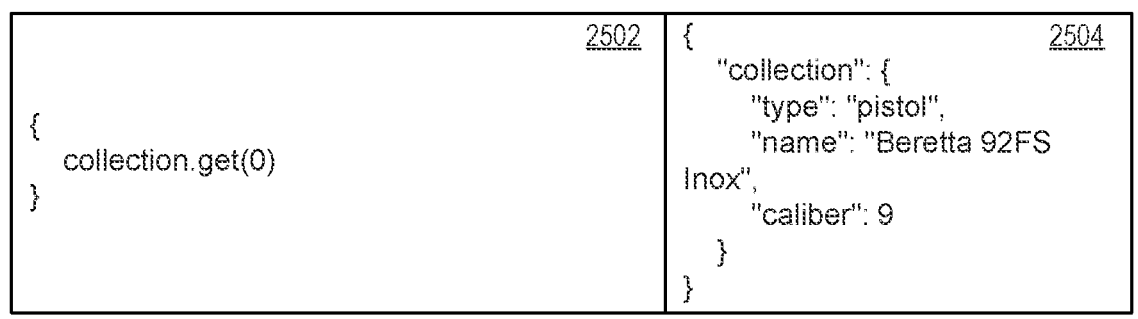
Figure 26:
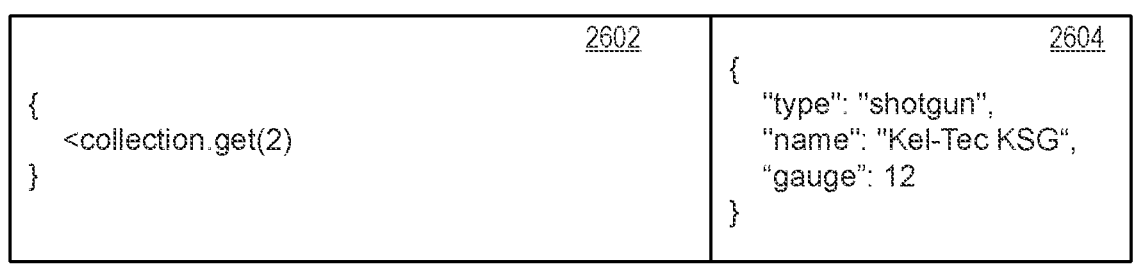

FIGS. 25-29 provide collection modifier queries and corresponding query results sets, in accordance with certain embodiments;

FIGS. 25 and 26 are schematic diagrams 2500 and 2600, respectfully, illustrating sample get queries 2502 and 2602 and resulting query results 2504 and 2604, in accordance with certain embodiments. The get (x) function returns an object/data at position x of an indicated collection. For example, in query 2502 an instruction to get the first (x=0) object in the collection returns, the first object in the collection list, as illustrated in results 2504. Similarly, query 2602 includes an instruction to get the third object in the collection (e.g., x=2), flattened, as indicated by the flattening delimiter indication (e.g., "<") Accordingly, the type and name of the third object in the collection are returned independently (e.g., outside of the collection).

FIG. 27 is a schematic diagram 2700, illustrating a sample flatten collection query 2702 and resulting query results 2704, in accordance with certain embodiments. As illustrated, the collection is "flattened", removing the objects from the collection.

FIG. 28 is a schematic diagram 2800, illustrating sample relational filter query 2802 and resulting query results 2804, in accordance with certain embodiments. As illustrated in the results 2804, when objects match the query conditions, the matching objects are returned. Similarly, FIG. 29 is a schematic diagram 2900, illustrating a sample relational filter query 2902 and resulting query results 2904, in accordance with certain embodiments.

FIG. 30 is a schematic diagram 3000, illustrating a sample less than, less than equal to, greater than, greater than or equal to query 3002 and resulting query results 3004, in accordance with certain embodiments. As may be appreciated, "empty" is returned with nothing, because there are no objects in the collection 308 that have a gauge specified that is <10. "One" is returned with the object that has a "gauge" over 10. "Two" is returned with objects less than or equal to 6.8. "Three" is returned with objects greater than or equal to 7.6.

Figure 31:
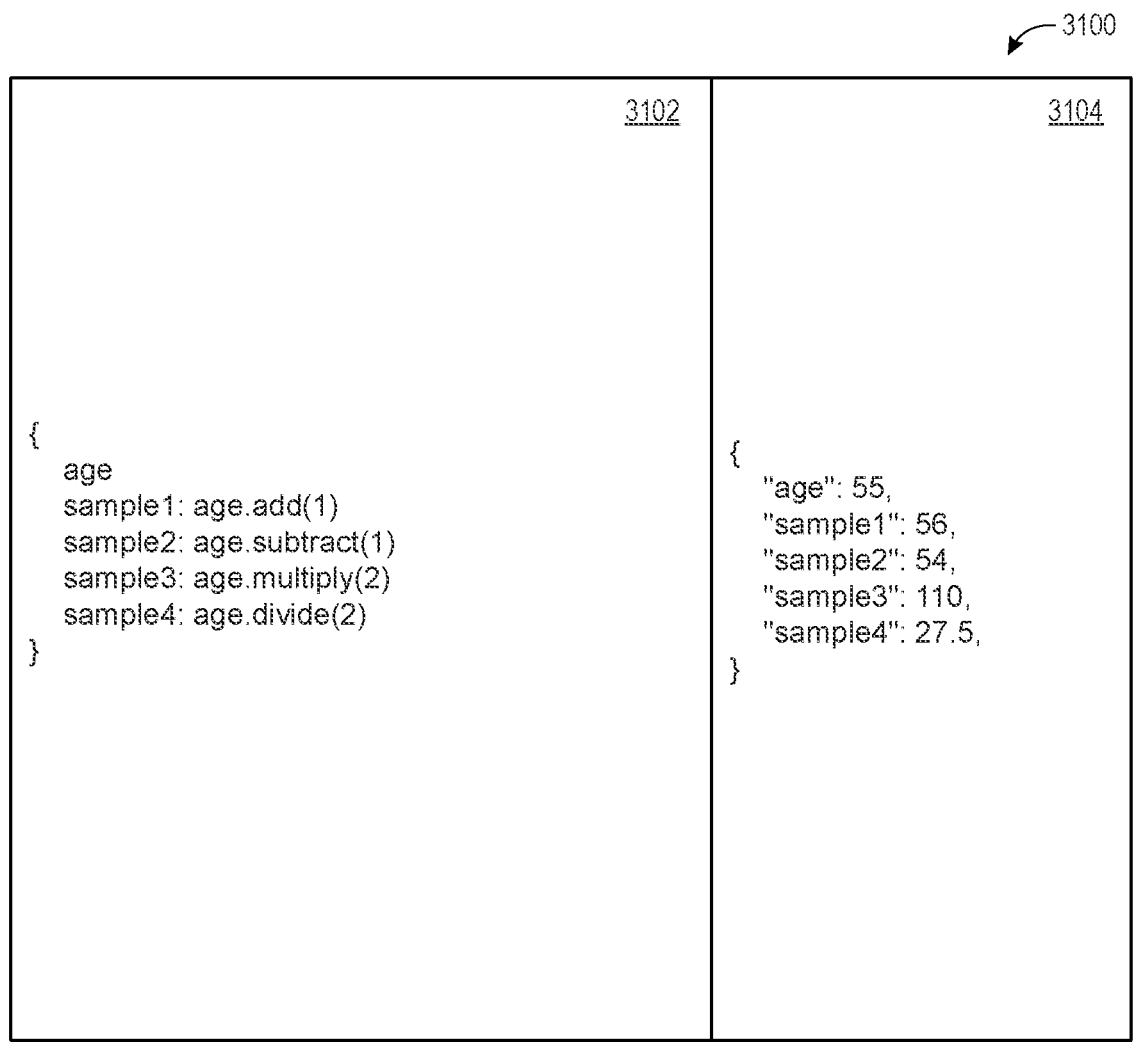
FIG. 31 is a schematic diagram, illustrating a mathematical operations query and resulting query results, in accordance with certain embodiments.

FIG. 31 is a schematic diagram 3100, illustrating a mathematical query 3102 and resulting query results 3104, in accordance with certain embodiments. Age returns 55, while the add (1) adds 1 to 55. Resulting in 56. Subtract (1)

results in subtracting 1 from 55, resulting in 54. Multiply 2 results in multiplying 55 by 2, resulting in 110 and divide (2) results in returning 55/2=27.5.

In some instances, date and/or time values may be beneficial in the results. Accordingly, the query service 102 may provide date and/or time values in its results. FIG. 32 is a schematic diagram 3200, illustrating a sample collection of data functions provided in a query 3202 and resulting query results 3204, in accordance with certain embodiments. The query 3202 may simply return a data, for a first instruction, parse, format, retrieve a particular part of a date (e.g., Month, Numerical Month Representation, Year, Era, Chronology, Day of Week, Day of Month, Day of the Year, dates to Epoch Date, etc.). Further, a Boolean value indicating whether it is a leap year can be returned. Functions may provide mathematical modifications to the date, such as adding and/or subtracting dates, week, months, etc.).

Similar functions may be provided by the query service 102 for time. FIG. 33 is a schematic diagram 3300, illustrating example time functions invoked via a sample time modifiers query 3302 and resulting query results 3304, in accordance with certain embodiments. For example, time can be returned, particular portions of the time may be returned (e.g., Hour, Minute, Second, nanosecond). Mathematical functions can be applied to the time, such as adding and/or subtracting hours, minutes, seconds, and/or nanoseconds. The time can be returned as a number of seconds that have passed in the day, a number of nanoseconds that have passed in the day, etc. Further, condition evaluation functions regarding the time may be provided, such as whether the time is before, after between and/or not between particular time values and/or ranges of time values.

In some instances, the query service 102 may provide functions that deal with date and time values. FIG. 34 is a schematic diagram, illustrating a sample data/time modifiers query 3400 and resulting query results 3404, in accordance with certain embodiments. These functions provide generally similar functionality to those described in FIGS. 32 and 33, except that the data values that they operate on include both date and time.

As may be appreciated, the current systems and techniques for result set querying provide significant benefits over traditional querying systems and techniques. Indeed, the current systems and techniques provide significant efficiency benefits over prior art systems, because the current systems do not rely upon a data contract between an API and the query system. In this manner, the current query system provides more efficient set up, processing, and flexibility than prior art systems that require a rigid schema setup with expected data values of an API.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium, comprising computer-readable instructions that, when executed by one or more processors of one or more computers, cause the one or more computers to:
    receive a query statement;
    request and receive, based upon the query statement, from an application programming interface (API), a result set, comprising string data of the API in a format defined by the API, wherein the result set comprises requested data of the query statement and additional data not requested by the query statement;
    interpret the query statement to identify a query of the result set that filters out the additional data while retaining the requested data;
    transform the string data of the result set into a node tree; and
    perform the query by:
        traversing the node tree to identify and gather relevant nodes of the node tree that are relevant to the query;
        performing any modifications, transformations, or both requested in the query on the relevant nodes, resulting in query results; and
        returning the query results to a requesting query client.

2. The tangible, non-transitory, computer-readable medium of claim 1, comprising computer readable instructions that, when executed by the one or more processors of the one or more computers, cause the one or more computers to traverse the node tree and perform the modifications, transformations, or both as part of a common processing step.

3. The tangible, non-transitory, computer-readable medium of claim 1, wherein the result set comprises a JavaScript Objection Notation (JSON) document.

4. The tangible, non-transitory, computer-readable medium of claim 3, comprising computer readable instructions that, when executed by the one or more processors of the one or more computers, cause the one or more computers to transform the JSON document into the node tree by reading the string data into plain old Java Objects (POJOs).

5. The tangible, non-transitory, computer-readable medium of claim 4, comprising computer readable instructions that, when executed by the one or more processors of the one or more computers, cause the one or more computers to insert the POJOs into the node tree, enabling traversal of the node tree to satisfy the query.

6. The tangible, non-transitory, computer-readable medium of claim 1, comprising computer readable instructions that, when executed by the one or more processors of the one or more computers, cause the one or more computers to perform the query independent of a data contract with the API that defines an expected schema of the result set.

7. The tangible, non-transitory, computer-readable medium of claim 1, comprising computer readable instructions that, when executed by the one or more processors of the one or more computers, cause the one or more computers to:
interpret the query statement, by:
cleaning the query statement by removing empty space from the query statement; and
identifying query instructions within the query statement, the query instructions indicating how to filter, modify, transform, or any combination thereof requested data of the result set.

8. The tangible, non-transitory, computer-readable medium of claim 7, wherein the query instructions comprise an indication to flatten the requested data, resulting in the requested data being returned independent of a containing object in the result set.

9. The tangible, non-transitory, computer-readable medium of claim 8, wherein the indication to flatten the requested data comprises a flattening delimiter symbol.

10. The tangible, non-transitory, computer-readable medium of claim 9, wherein the flattening delimiter symbol comprises "<".

11. The tangible, non-transitory, computer-readable medium of claim 7, wherein the query instructions comprise an indication to replace at least a portion of the requested data, resulting in the requested data being returned with modifications to data values of the requested data from the result set.

12. A computer-implemented method, comprising:
receiving a query statement;
requesting and receiving, based upon the query statement, from an application programming interface (API), a result set, comprising string data of the API in a format defined by the API, wherein the result set comprises requested data of the query statement and additional data not requested by the query statement;
interpreting the query statement to identify a query of the result set that filters out the additional data while retaining the requested data;
transforming the string data of the result set into a node tree; and
performing the query by:
traversing the node tree to identify and gather relevant nodes of the node tree that are relevant to the query;
performing any modifications, transformations, or both requested in the query on the relevant nodes, resulting in query results; and
returning the query results to a requesting query client.

13. The computer-implemented method of claim 12, comprising traversing the node tree and performing the modifications, transformations, or both as part of a common processing step.

14. The computer-implemented method of claim 12, wherein the result set comprises a JavaScript Objection Notation (JSON) document, the computer-implemented method comprising:
transforming the JSON document into the node tree by reading the string data into plain old Java Objects (POJOs); and
inserting the POJOs into the node tree, enabling traversal of the node tree to satisfy the query.

15. The computer-implemented method of claim 12, comprising:
performing the query independent of a data contract with the API that defines an expected schema of the result set.

16. The computer-implemented method of claim 12, comprising:
interpreting the query statement, by:
cleaning the query statement by removing empty space from the query statement; and
identifying query instructions within the query statement, the query instructions indicating how to filter, modify, transform, or any combination thereof requested data of the result set.

17. The computer-implemented method of claim 16, wherein the query instructions comprise a flattening delimiter symbol providing an indication to flatten the requested data, resulting in the requested data being returned independent of a containing object in the result set.

18. A system, comprising:
a query client, configured to provide a request, in a query statement, for a query of a result set comprising data provided from an application programming interface (API); and
a query service, configured to:
receive the query statement;
request and receive, based upon the query statement, from the application programming interface (API), the result set, comprising string data of the API in a format defined by the API, wherein the result set comprises requested data of the query statement and additional data not requested by the query statement;
interpret the query statement to identify a query of the result set that filters out the additional data while retaining the requested data;
transform the string data of the result set into a node tree; and
perform the query independent of a data contract with the API that defines an expected schema of the result set, by:
traversing the node tree to identify and gather relevant nodes of the node tree that are relevant to the query;
performing any modifications, transformations, or both requested in the query on the relevant nodes, resulting in query results; and
returning the query results to the query client.

19. The system of claim 18, wherein the query service is configured to:
receive in the query statement a request to flatten data in the query results; and
in response to the request to flatten the data in the query results, return, in the query results, the data requested to be flattened independent of a containing object.

20. The system of claim 18, wherein the result set comprises a JavaScript Objection Notation (JSON) document and the query service is configured to:
- transform the JSON document into the node tree by reading the string data into plain old Java Objects (POJOs); and
- insert the POJOs into the node tree, enabling traversal of the node tree to satisfy the query.

\* \* \* \* \*